US009976521B1

(12) United States Patent
Jentz et al.

(10) Patent No.: US 9,976,521 B1
(45) Date of Patent: May 22, 2018

(54) METHOD AND SYSTEM FOR EXHAUST GAS RECIRCULATION SYSTEM DIAGNOSTICS

(71) Applicant: Ford Global Technologies, LLC, Dearborn, MI (US)

(72) Inventors: Robert Roy Jentz, Westland, MI (US); Scott Steadmon Thompson, Sterling Heights, MI (US); Pat Edward Smithberger, Howell, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days. days.

(21) Appl. No.: 15/414,510

(22) Filed: Jan. 24, 2017

(51) Int. Cl.
*F02M 26/49* (2016.01)
*F02M 26/04* (2016.01)
*F02D 41/00* (2006.01)
*F02D 41/26* (2006.01)

(52) U.S. Cl.
CPC .......... *F02M 26/49* (2016.02); *F02D 41/005* (2013.01); *F02D 41/0007* (2013.01); *F02D 41/26* (2013.01); *F02M 26/04* (2016.02); F02D 2200/022 (2013.01); F02D 2200/101 (2013.01)

(58) Field of Classification Search
CPC .... F02D 41/00; F02D 41/0007; F02D 41/005; F02D 41/26; F02M 26/04; F02M 26/49
USPC ............... 701/108, 114; 123/568.21, 568.16, 123/406.21, 406.22; 73/114.71–114.74
See application file for complete search history.

(56) References Cited

U.S. PATENT DOCUMENTS

| 5,508,926 | A | 4/1996 | Wade | |
|---|---|---|---|---|
| 5,639,961 | A * | 6/1997 | Lautenschutz | F02D 35/027 123/406.48 |
| 6,457,461 | B1 | 10/2002 | Romzek | |
| 2005/0210970 | A1 * | 9/2005 | Terada | F02D 41/0055 73/114.76 |
| 2010/0042284 | A1 * | 2/2010 | Sasaki | F02D 41/0072 701/31.4 |
| 2012/0290190 | A1 * | 11/2012 | Kim | F02M 26/49 701/102 |
| 2013/0073179 | A1 * | 3/2013 | Song | F02D 41/0072 701/102 |

FOREIGN PATENT DOCUMENTS

DE            19849272 A1     5/2000

* cited by examiner

*Primary Examiner* — John Kwon
*Assistant Examiner* — Johnny H Hoang
(74) *Attorney, Agent, or Firm* — Julia Voutyras; McCoy Russell LLP

(57) ABSTRACT

Methods and systems are provided for on-board diagnostics of an exhaust gas recirculation system. In one example, a method may include dynamically estimating upper and lower EGR limits based on a commanded EGR flow and estimating a ratio of accumulated difference between a measured EGR flow and one of the upper and lower EGR limits to accumulated commanded EGR flow, over a duration of time. EGR system degradation may be indicated in response to the ratio being higher than a threshold.

20 Claims, 8 Drawing Sheets

METHOD AND SYSTEM FOR EXHAUST GAS RECIRCULATION SYSTEM DIAGNOSTICS

FIELD

The present description relates generally to methods and systems for on-board diagnostics of components of an exhaust gas recirculation (EGR) system.

BACKGROUND/SUMMARY

Engine systems may utilize recirculation of exhaust gas from an engine exhaust system to an engine intake system, a process referred to as exhaust gas recirculation (EGR), to reduce regulated emissions. An EGR valve may be controlled to achieve a desired intake air dilution for the given engine operating conditions. Traditionally, the amount of low pressure EGR (LP-EGR) and/or high pressure EGR (HP-EGR) routed through the EGR system is measured and adjusted based on engine speed, engine temperature, and load during engine operation to maintain desirable combustion stability of the engine while providing emissions and fuel economy benefits. EGR effectively cools combustion chamber temperatures thereby reducing NOx formation. Also, EGR reduces pumping work of an engine and increases compression ratio resulting in increased fuel economy. A diagnostic procedure may need to be periodically or opportunistically carried out to monitor operation of the EGR system.

Various approaches are provided for diagnostics of an EGR system. In one example, as shown in U.S. Pat. No. 5,508,926, Wade discloses a method for detecting restrictions in the EGR system during steady-state engine operations. Air pressure in the engine intake manifold is monitored over a test period while an amount (determined based on engine operating conditions) of EGR is delivered to the intake manifold. Changes in the monitored air pressure are filtered through a lag filter process comprising a dynamic filter coefficient. The filtered air pressure is then compared to a dynamic threshold to determine presence of a restriction in the EGR system.

However, the inventors herein have recognized potential issues with such systems. As one example, by relying on a single dynamic threshold for EGR system diagnostics, it may not be possible to differentiate between degradations in the EGR system causing insufficient EGR flow and those causing excessive EGR flow. Also, the approach of Wade may not be able to detect undesired EGR flow occurring when EGR is not requested. As another example, the approach of Wade is limited to steady-state conditions. However it may be desired to also perform EGR diagnostics during transient engine operating conditions so as to reduce tailpipe emissions.

In one example, the issues described above may be at least partly addressed by a method for an engine comprising: as commanded EGR flow changes, dynamically adjusting upper and lower EGR limits based on the commanded EGR flow, indicating EGR system degradation based on a ratio of accumulated difference between a measured EGR flow and one of the upper and lower EGR limits to accumulated commanded EGR flow relative to a threshold, the threshold based on exhaust NOx levels, and adjusting EGR flow based on the indication of degradation. In this way, by dynamically updating an EGR tolerance band based on commanded EGR flow, and correspondingly adjusting a threshold for EGR system degradation detection based on emissions levels, EGR system diagnostics may be effectively carried out during both steady-state and transient engine operating conditions.

As one example, a diagnostic routine of the EGR system may be carried out periodically or opportunistically during a vehicle drive cycle. As engine operating conditions change, a commanded EGR flow may be varied to meet the changing EGR demand. A dynamic EGR tolerance band may also be computed, the tolerance band having a lower limit and a higher limit, each based on the commanded EGR flow. In one example, the tolerance band may be calculated as a function of the commanded EGR flow using a multiplier whose value changes with change (e.g., magnitude of change and rate of change) in EGR flow, such as based on whether there is an increase or decrease in the commanded EGR flow rate. An actual EGR flow rate is measured via an EGR flow sensor, such as a pressure sensor (either an absolute pressure sensor or a delta pressure sensor). If the measured EGR flow rate is higher than the commanded flow rate, a difference between the higher limit of the tolerance band and the measured EGR flow rate may be estimated to obtain a mass flow error. If the measured EGR flow rate is lower than the commanded flow rate, a difference between the lower limit of the tolerance band and the measured EGR flow rate may be estimated to obtain the mass flow error. If EGR flow is detected during conditions when EGR is not commanded (that is, commanded EGR flow rate is zero), a difference between a fixed EGR (upper) limit and the measured EGR flow rate may be estimated to obtain the mass flow error. The mass flow error and the commanded EGR mass flow may be accumulated over a duration (herein also referred to as the test period). The ratio of the accumulated mass flow error to the accumulated commanded EGR mass flow may then be compared to a threshold. Distinct thresholds may be applied for diagnosing insufficient EGR flow, undesired EGR flow, and excessive EGR flow events taking into account acceptable limits of tailpipe emissions in each case. Degradation of the EGR system may be indicated and a diagnostics code may be set if the ratio is higher than the specified threshold. Upon indication of degradation in the EGR system, further supply of EGR may be temporarily disabled by closing the EGR valve. In one example, where the diagnostics approach is used to diagnose a high pressure (HP) EGR system, in response to degradation of the HP-EGR system, EGR delivered via a low pressure (LP) EGR system may be increased.

In this way, by dynamically adjusting an EGR tolerance band based on the commanded EGR flow, and varying the threshold for detection of EGR system degradation based on emissions standards, undesired tailpipe emissions caused by degraded EGR system may be reduced. By selecting distinct thresholds for the diagnostics procedure based on the commanded EGR flow rate relative to the measured EGR flow rate, degradation of the EGR system resulting in insufficient EGR flow may be distinguished from degradation resulting in excessive EGR flow, and appropriately addressed. By estimating undesired EGR flow (when EGR is not commanded) based on an accumulated intake air flow, leaks in an EGR valve may be detected. The technical effect of dynamically computing the tolerance band for EGR mass flow error estimation taking into consideration changes in EGR flow is that erroneous indications of EGR system degradation due to transport delays between delivered and commanded EGR flow rates may be reduced. Overall, by enabling diagnostics of the EGR system to be carried out reliably and accurately, the fuel economy and emissions benefits of EGR may be extended over a wider range of engine operating conditions.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
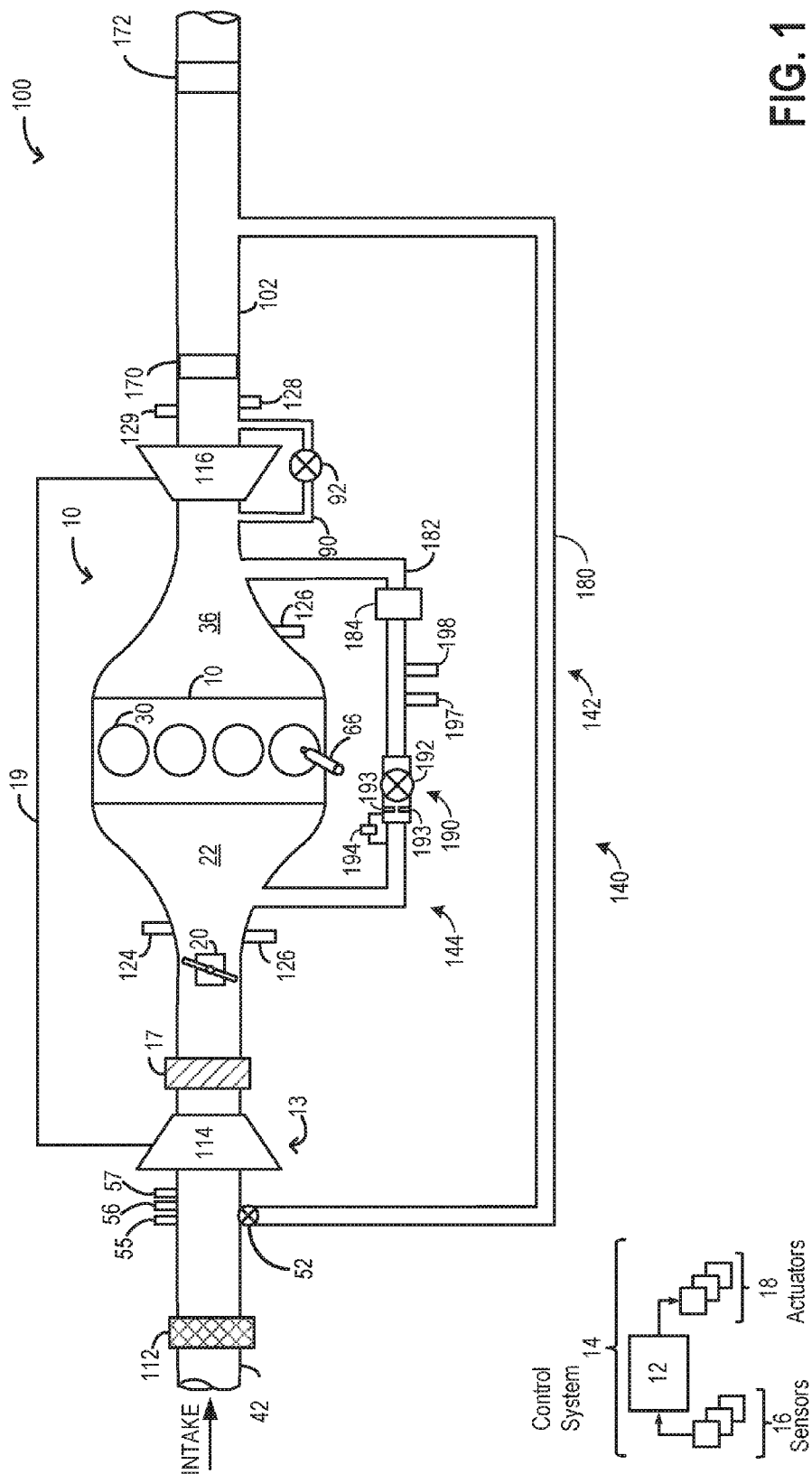
FIG. 1 shows a schematic diagram of an example engine system including an exhaust gas recirculation (EGR) system.

The following description relates to systems and methods for on-board diagnostics of an exhaust gas recirculation (EGR) system. An example boosted engine system including a low-pressure EGR and a high-pressure EGR system is shown in FIG. 1. An engine controller may be configured to perform a control routine, such as the example routines of FIGS. 2, 3, and 4 for carrying out on-board diagnostics of the EGR system during insufficient, excessive, and undesired EGR flow. Examples of the diagnostic procedures for detecting degradation of the HP-EGR system are shown in FIGS. 5-8.

FIG. 1 schematically shows aspects of an example engine system 100 including an engine 10. In the depicted embodiment, engine 10 is a boosted engine coupled to a turbocharger 13 including a compressor 114 driven by a turbine 116. The exhaust turbine 116 may be configured as a variable geometry turbine (VGT). Specifically, fresh air is introduced along intake passage 42 into engine 10 via air cleaner 112 and flows to compressor 114. The compressor may be any suitable intake-air compressor, such as a motor-driven or driveshaft driven supercharger compressor. In engine system 10, the compressor is a turbocharger compressor mechanically coupled to turbine 116 via a shaft 19, the turbine 116 driven by expanding engine exhaust. A wastegate actuator 92 may be actuated open to dump at least some exhaust pressure from upstream of the turbine to a location downstream of the turbine via wastegate 90. By reducing exhaust pressure upstream of the turbine, turbine speed can be reduced, which in turn may facilitate reduction in compressor surge and over boosting issues.

The compressor 114 may be coupled, through charge-air cooler (CAC) 17 to throttle valve 20. Throttle valve 20 is coupled to engine intake manifold 22. From the compressor, the compressed air charge flows through the charge-air cooler 17 and the throttle valve to the intake manifold. A compressor recirculation passage (not shown) may be provided for compressor surge control. Specifically, to reduce compressor surge, such as on a driver tip-out, boost pressure may be dumped from the intake manifold, downstream of the CAC 17 and upstream of throttle valve 20, to intake passage 42. By flowing boosted air from upstream of an intake throttle inlet to upstream of the compressor inlets, boost pressure may be rapidly reduced, expediting boost control.

One or more sensors may be coupled to an inlet of compressor 114. For example, a temperature sensor 55 may be coupled to the inlet for estimating a compressor inlet temperature, and a pressure sensor 56 may be coupled to the inlet for estimating a compressor inlet pressure. As another example, a humidity sensor 57 may be coupled to the inlet for estimating a humidity of aircharge entering the compressor. Still other sensors may include, for example, air-fuel ratio sensors, etc. In other examples, one or more of the compressor inlet conditions (such as humidity, temperature, pressure, etc.) may be inferred based on engine operating conditions. In addition, when exhaust gas recirculation (EGR) is enabled, the sensors may estimate a temperature, pressure, humidity, and air-fuel ratio of the aircharge mixture including fresh air, recirculated compressed air, and exhaust residuals received at the compressor inlet.

In some examples, intake manifold 22 may include an intake manifold pressure sensor 124 for estimating a manifold pressure (MAP) and/or an intake air flow sensor 126 for estimating a mass air flow (MAF) in the intake manifold 22. Intake manifold 22 is coupled to a series of combustion chambers 30 through a series of intake valves (not shown). The combustion chambers are further coupled to exhaust manifold 36 via a series of exhaust valves (not shown). In the depicted embodiment, a single exhaust manifold 36 is shown. However, in other embodiments, the exhaust manifold may include a plurality of exhaust manifold sections. Configurations having a plurality of exhaust manifold sections may enable effluent from different combustion chambers to be directed to different locations in the engine system.

In one embodiment, each of the exhaust and intake valves may be electronically actuated or controlled. In another embodiment, each of the exhaust and intake valves may be cam actuated or controlled. Whether electronically actuated or cam actuated, the timing of exhaust and intake valve opening and closure may be adjusted as needed for desired combustion and emissions-control performance.

Combustion chambers 30 may be supplied one or more fuels, such as gasoline, alcohol fuel blends, diesel, biodiesel, compressed natural gas, etc., via injector 66. Fuel may be supplied to the combustion chambers via direct injection, port injection, throttle valve-body injection, or any combination thereof. In the combustion chambers, combustion may be initiated via spark ignition and/or compression ignition.

As shown in FIG. 1, exhaust from the one or more exhaust manifold sections is directed to turbine 116 to drive the turbine. The combined flow from the turbine and the wastegate then flows through emission control device 170. In general, one or more emission control devices 170 may include one or more exhaust after-treatment catalysts configured to catalytically treat the exhaust flow, and thereby reduce an amount of one or more substances in the exhaust flow. For example, one exhaust after-treatment catalyst may be configured to trap $NO_x$ from the exhaust flow when the exhaust flow is lean, and to reduce the trapped $NO_x$ when the exhaust flow is rich. In other examples, an exhaust after-treatment catalyst may be configured to disproportionate $NO_x$ or to selectively reduce $NO_x$ with the aid of a reducing agent. In still other examples, an exhaust after-treatment catalyst may be configured to oxidize residual hydrocarbons and/or carbon monoxide in the exhaust flow. Different exhaust after-treatment catalysts having any such functionality may be arranged in wash coats or elsewhere in the exhaust after-treatment stages, either separately or together. In some embodiments, the exhaust after-treatment stages may include a regeneratable soot filter configured to trap and oxidize soot particles in the exhaust flow. All or part of the treated exhaust from emission control 170 may be released into the atmosphere via exhaust passage 102 after passing through a muffler 172.

A part of the exhaust from exhaust passage 102 may be recirculated to the intake manifold 22 via an exhaust gas recirculation (EGR) system 140 comprising a low pressure exhaust gas recirculation (LP-EGR) delivery system 142 and a high pressure exhaust gas recirculation (HP-EGR) delivery system 140. The low pressure exhaust gas recirculation (LP-EGR) delivery passage 180 may be coupled to the exhaust passage 102 at a location upstream of emission control device 170. A portion of exhaust gas from the exhaust pipe 102 may be delivered from downstream of the turbocharger turbine 116 to the engine intake manifold 22, upstream of a turbocharger compressor 114 as LP-EGR. Opening of an EGR valve 52 may be regulated to control the flow of exhaust from the exhaust passage 102 to the intake manifold 22 via the EGR passage 180. EGR valve 52 may be opened to admit a controlled amount of exhaust gas to the compressor inlet for desirable combustion and emissions control performance. A portion of exhaust gas from the exhaust passage 102 may be delivered from upstream of a turbocharger turbine 116 to the engine intake manifold 22, downstream of a turbocharger compressor 114 via HP-EGR passage 182. An EGR cooler 184 may be coupled to the HP-EGR passage 182 to cool the exhaust before being delivered to the intake manifold. A HP-EGR valve assembly 190 may be coupled to the HP-EGR passage to regulate exhaust flow from the exhaust passage 102 to the intake manifold 22 via the EGR passage 182. The valve assembly 190 may comprise an EGR valve 192 with an EGR valve position sensor and two 100 mm orifices 193. A delta pressure sensor 194 may be coupled across the valve assembly 190 and the HP-EGR delivery passage 182. EGR flow rate via the HP-EGR passage 182 may be estimated based on inputs from the EGR valve position sensor and the delta pressure sensor 194.

EGR valve 52 may also be part of a valve assembly coupled to the LP-EGR passage 180 (similar to that of the HP-EGR valve assembly 190). Valves 52 and 192 may be configured as a continuously variable valves. In an alternate example, however, EGR valves 52 and 192 may be configured as an on/off valve.

One or more sensors may be coupled to EGR passages 180 and 182 for providing details regarding the composition and condition of the EGR. For example, a temperature sensor 197 may be provided for determining a temperature of the EGR, an absolute pressure sensor 198 may be provided for determining a pressure of the EGR, a humidity sensor may be provided for determining a humidity or water content of the EGR, and an air-fuel ratio sensor may be provided for estimating an air-fuel ratio of the EGR. Alternatively, EGR conditions may be inferred by the one or more temperature, pressure, humidity, and air-fuel ratio sensors 55-57 coupled to the compressor inlet. In one example, air-fuel ratio sensor 57 is an oxygen sensor.

The amount of low pressure EGR (LP-EGR) and/or high pressure EGR (HP-EGR) routed through the EGR system 140 may be requested to attain a desired engine dilution, thereby improving fuel efficiency and emissions quality. An amount of EGR requested may be based on engine operating conditions including engine load, engine speed, engine temperature, etc. For example, the controller may refer a look-up table having the engine speed and load as the input, and having a signal corresponding to a degree of opening to command to the EGR valve as the output, the degree of opening providing a dilution amount corresponding to the input engine speed-load. In another example, the controller may rely on a model that correlates the change in engine load with a change in the engine's dilution requirement, and further correlates the change in the engine's dilution requirement with a change in the EGR requirement. For example, as engine load increases from a low load to a mid-load, EGR requirement may increase, and then as engine load increases from a mid-load to a high load, EGR requirement may decrease. A diagnostic procedure may need to be periodically or opportunistically carried out to monitor operation of the EGR system in order to reduce the possibility of EGR system degradation resulting in undesirable emissions quality. As an example, the diagnostics routine may be performed once per trip.

For the HP-EGR system 144, when measured EGR flow is higher than commanded EGR flow, EGR system degradation may be indicated based on a first accumulated difference between the measured EGR flow and an upper limit of a tolerance band, accumulated over a duration or distance or travel of the vehicle. As such, a first ratio of the first accumulated difference to an accumulated commanded EGR mass flow may be estimated over the duration and degradation in the EGR system causing excessive EGR flow may be indicated in response to the first ratio being higher than a first threshold. When the measured EGR flow is lower than commanded EGR flow, EGR system degradation may be indicated based on a second accumulated difference between the measured EGR flow and a lower limit of the tolerance band accumulated over the duration or distance or travel of the vehicle. Similarly, a second ratio of the second accumulated difference to the accumulated commanded EGR mass flow may be estimated over the duration and degradation in the EGR system causing insufficient EGR flow may be indicated in response to the second ratio being higher than a second threshold. Each of the upper limit and the lower limit of the tolerance band may be dynamically adjusted based on a function of the commanded EGR flow, a fixed error margin, and a multiplier, the multiplier determined as a function of the commanded EGR flow. The first threshold may be different from the second threshold. In one example, the first threshold may be higher than the second threshold. Dynamic adjusting the upper and lower limits of the tolerance band, allows for compensation in threshold for transient flow changes where an overshoot may occur. It also allows ease of calibration to mitigate expected errors associated with the transport delay between when EGR flow is commanded and can be delivered through control of the valve.

For the HP-EGR system 144, when no EGR flow is commanded and measured EGR flow is higher than the commanded no EGR flow, a third accumulated difference between the measured EGR flow and an error limit may be estimated over the duration, a third ratio of the third accumulated difference to accumulated commanded intake air mass flow, accumulated over the duration, may then be estimated and EGR system degradation may be indicated in response to the third ratio being higher than a third threshold. The third threshold may be different from each of the first and second threshold. In one example, the third threshold may be lower than the second threshold. Each of the first threshold, the second threshold, and the third threshold may be based on a measured exhaust emissions component level including one of an exhaust NOx level and an exhaust particulate matter level. In this way, by detecting degradation of the EGR system based on one of the first threshold, the second threshold, and the third threshold, undesired emissions causing increase in NOx level and/or particulate matter level caused due to EGR system degradation may be reduced. Details of the diagnostic procedures for the HP-EGR system 144 are discussed with regard to FIGS. 2, 3, and 4. A similar diagnostic procedure may also be carried out for the LP-EGR system 142. In case of LP-EGR, EGR mass flow may be measured based on inputs from one or more of the temperature, pressure, humidity, and air-fuel ratio sensors 55-57 coupled to the compressor inlet. Also, an exhaust pressure sensor may be coupled to the LP-EGR delivery passage 180 to estimate the EGR flow rate using the delta pressure over valve (DPOV) method.

Engine system 100 may further include control system 14. Control system 14 is shown receiving information from a plurality of sensors 16 (various examples of which are described herein) and sending control signals to a plurality of actuators 18 (various examples of which are described herein). As one example, sensors 16 may include MAP sensor 124, MAF sensor 126, exhaust temperature sensor 128, exhaust pressure sensor 129, EGR temperature sensor 197, EGR absolute pressure sensor 198, EGR delta pressure sensor 194, compressor inlet temperature sensor 55, compressor inlet pressure sensor 56, compressor inlet humidity sensor 57, crankshaft sensor, pedal position sensor, and engine coolant temperature sensor. Other sensors such as additional pressure, temperature, air/fuel ratio, and composition sensors may be coupled to various locations in engine system 100. The actuators 18 may include, for example, throttle 20, LP-EGR valve 52, HP-EGR valve 192, wastegate valve 92, and fuel injector 66. The control system 14 may include a controller 12. The controller 12 may receive input data from the various sensors, process the input data, and trigger various actuators in response to the processed input data based on instruction or code programmed therein corresponding to one or more routines. For example, the controller may infer a flow rate of EGR flowing through the EGR passage 182 based on inputs from delta pressure sensor 194 and absolute pressure sensor 198, and in response to a difference between a commanded EGR flow rate and the measured flow rate may perform a diagnostic routine to monitor the operation of the HP-EGR system 144. In response to indication of degradation in the HP-EGR system 144, the controller may send a signal to an actuator of the HP-EGR valve 192 to close the valve in order to suspend further EGR flow.

In this way, the system of FIG. 1 provides for a vehicle engine system comprising an intake manifold and an exhaust manifold, a turbocharger comprising an exhaust turbine and an intake compressor, a low-pressure exhaust gas recirculation (LP-EGR) system comprising a first EGR passage with a first EGR valve for recirculating exhaust from downstream of the turbine in the exhaust manifold to upstream of the compressor in the intake manifold, a high-pressure exhaust gas recirculation (HP-EGR) system comprising a second EGR passage with a second EGR valve for recirculating exhaust from the upstream of the turbine in the exhaust manifold to downstream of the compressor in the intake manifold, a temperature sensor, an absolute pressure sensor, and a differential pressure sensor coupled to each of the LP-EGR and the HP-EGR system. The engine system further comprises a controller with computer readable instructions stored on non-transitory memory for: in response to measured EGR flow via the HP-EGR system being higher or lower than a commanded EGR flow, accumulating a difference between the measured EGR flow and one of an upper limit and a lower limit over a duration of vehicle travel, the upper and lower limit dynamically adjusted as a function of the commanded EGR flow, accumulating the commanded EGR flow over the duration, in response to a ratio of the accumulated difference to the accumulated commanded EGR flow being higher than the threshold, indicating degradation of the HP-EGR system, and in response to the indicating, actuating the second EGR valve to a closed position while increasing an opening of the first EGR valve.

Figure 2:
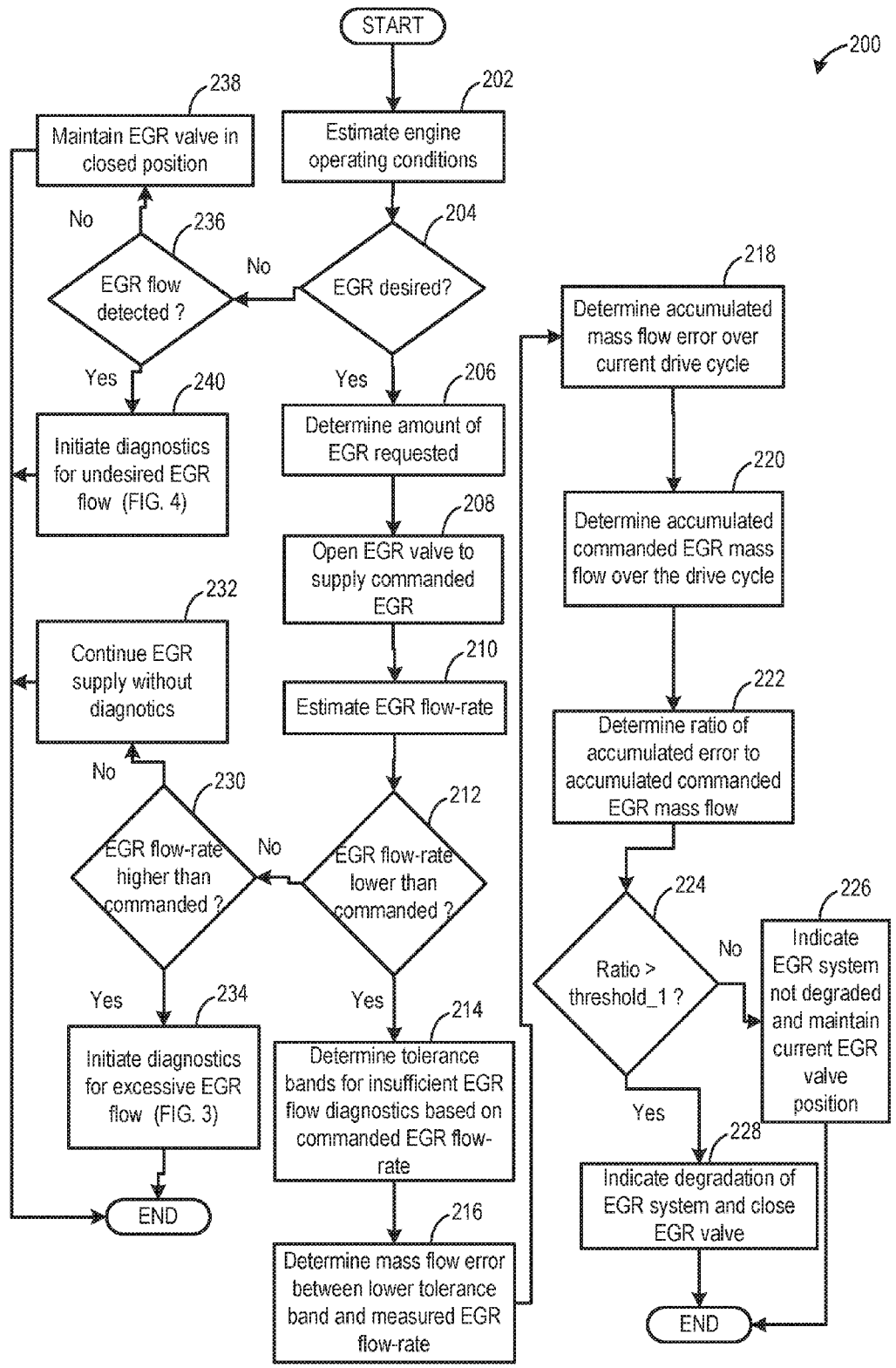
FIG. 2 shows a flow chart illustrating a method that can be implemented for overall diagnostics of the EGR system including during insufficient EGR flow.

FIG. 2 illustrates an example method 200 that may be implemented for diagnosing the HP-EGR system (such as HP-EGR system 144 in FIG. 1). The method may enable identification of EGR system degradation causing insufficient EGR flow, for example. Example method 200 and the rest of the methods included herein may be carried out for on-board diagnostics of each of the LP-EGR and the HP-EGR systems. Instructions for carrying out method 200 and the rest of the methods may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

At 202, the routine includes estimating and/or measuring engine operating conditions. Conditions assessed may include, for example, engine temperature, engine load, driver torque demand, boost demand, manifold air flow, manifold air pressure, engine speed, throttle position, exhaust pressure, exhaust air/fuel ratio, ambient conditions including ambient temperature, pressure, and humidity, etc.

At 204, the routine includes determining if EGR is requested for engine operations. EGR may be requested to attain a desired engine dilution, thereby improving fuel efficiency and emissions quality. EGR may be desired after the exhaust catalyst has attained their respective light-off temperature. An amount of EGR requested may be based on engine operating conditions including engine load as estimated via a pedal position sensor, engine speed as estimated via a crankshaft acceleration sensor, engine temperature as estimated via an engine coolant temperature sensor, etc.

If it is determined that EGR is desired for optimal engine operations, at 206, the amount of EGR requested (commanded EGR amount) may be determined. For example, the controller may refer to a look-up table having the engine speed and load as the input, and having a signal corresponding to a degree of opening to apply to the EGR valve as the output, the degree of opening providing a dilution amount corresponding to the input engine speed-load. In another example, the controller may determine the EGR amount through a determination that directly takes into account parameters such as engine load, engine speed, engine temperature, etc. In still other examples, the controller may rely on a model that correlates the change in engine load with a change in the engine's dilution requirement, and further correlates the change in the engine's dilution requirement with a change in the EGR requirement. For example, as engine load increases from a low load to a mid-load, EGR requirement may increase, and then as engine load increases from a mid-load to a high load, EGR requirement may decrease. The controller may further determined the amount of EGR requested taking into account a best fuel economy mapping for a desired dilution rate. Further, internal (residual) EGR may be achieved from overlap of intake/exhaust valve opening (such as VCT CAM control). The controller may also determine a ratio of EGR to be suppled as HP-EGR relative to EGR to be supplied as LP-EGR. In one example, the amount of EGR delivered as HP-EGR may be increased during boosted engine operating conditions while the amount of EGR delivered as LP-EGR may be increased during naturally aspirated engine operating conditions.

At 208, the controller may send a signal to the HP-EGR valve and/or LP-EGR valve to open the valve(s) to supply the commanded amount of EGR through the HP-EGR and/LP-EGR passages. The opening of the EGR valve(s) may be adjusted based on the commanded amount of EGR. As an example, the opening of the HP-EGR valve may be increased with an increase in the amount of HP-EGR commanded while the opening of the LP-EGR valve may be increased with an increase in the amount of LP-EGR commanded.

At 210, the EGR mass flow rate (flow rate of exhaust flowing through HP-EGR passage) may be estimated based on inputs from one or more EGR sensors such as an EGR delta pressure sensor and an EGR (absolute) pressure sensor coupled to the EGR system (such as EGR delta pressure sensor 194 and EGR pressure sensor 198 of FIG. 1). Alternatively, EGR flow rate may be inferred by the one or more temperature, pressure, humidity, and air-fuel ratio sensors coupled to the compressor inlet. In one example, the measured EGR flow rate may be accumulated for a predetermined time period and compared to the commanded EGR flow rate accumulated over the same time period.

At 212, the routine includes determining if the accumulated measured HP-EGR flow rate is lower than the accumulated commanded HP-EGR flow rate. Alternatively, the accumulated commanded EGR flow rate may be compared to a threshold flow rate.

If it is determined that the commanded measured EGR flow rate is lower than the commanded EGR flow rate, or if the accumulated commanded EGR flow rate is lower than the threshold flow rate, it may be inferred that the actual EGR flow is insufficient relative to the commanded EGR flow. The lower than commanded EGR flow is undesirable since it may result in higher levels of emissions and increase fuel consumption. As such, the accumulated commanded EGR flow rate may be used to determine when enough EGR has been commanded to carry out a diagnostic routine of the EGR system. As an example, if the difference between the accumulated measured HP-EGR flow rate and the accumulated commanded HP-EGR flow rate is high enough to exceed a threshold emissions level during an emissions test (such as FTP) cycle, the diagnostic routine may be initiated. Therefore, in order to detect any degradation in the EGR system, an EGR diagnostic routine for insufficient HP-EGR flow may be carried out, as discussed below.

At 214, a dynamic fault tolerance band with an upper limit and a lower limit may be determined (for insufficient EGR flow) based on the commanded EGR flow rate. A fixed error margin may be used for determining the upper and lower limits of the tolerance band. The limits of the tolerance bands may be computed based on a measured linear flow distance from an expected (function of commanded) EGR mass flow. An additional multiplier may be used to adjust the tolerance band during change in EGR flow direction such as during increase or decrease in the commanded EGR flow rate based on engine operating conditions. For example, during an increase in the commanded EGR flow, the additional multiplier may be used to increase the upper limit, thereby enlarging the tolerance band. As another example, during a decrease in the commanded EGR flow, the additional multiplier may be used to decrease the lower limit, thereby enlarging the tolerance band. The multiplier provides increased error tolerance in the direction of changing flow while during steady flow, a fixed error margin may be used. By adjusting the tolerance band during changes in EGR flow direction, inaccurate detection of EGR system degradation due to transport delays between commanded and measured EGR flow rate or due to PID controller inaccuracies may be reduced. The upper limit of the tolerance band for insufficient EGR flow may be computed based on equation 1 while the lower limit of the tolerance band may be computed based on equation 2 as:

$$T_{lo1} = \dot{M}_{cmd} - S_{err} \tag{1}$$

$$T_{hi1} = \dot{M}_{cmd} + (\dot{M}_{cmd} - \dot{M}_{mult}) + S_{err} \tag{2}$$

where, $T_{lo1}$ is the lower limit of the tolerance band, $\dot{M}_{cmd}$ is the commanded EGR mass flow, $S_{err}$ is the fixed error margin, $T_{hi1}$ is the higher limit of the tolerance band, $\dot{M}_{exp}$ is the expected EGR mass flow, and $\dot{M}_{mult}$ is an EGR mass flow multiplier. The mass flow multiplier may be based on the commanded EGR flow. The expected EGR mass flow ($\dot{M}_{exp}$) is a filtered version of the commanded EGR mass flow ($\dot{M}_{cmd}$).

At 216, mass flow error between the lower limit of the tolerance band and the measured EGR flow rate may be determined over a drive cycle (or a different test period). At 218, an accumulated mass flow error over the current drive cycle, as given by equation 3, may be determined as:

$$E_{mfl} = \Sigma(T_{lo1} - \dot{M}_{md}) \tag{3}$$

where, $E_{mfl}$ is the accumulated mass flow error over the current drive cycle, $T_{lo1}$ is the lower limit of the tolerance band, and $\dot{M}_{md}$ is the measured EGR mass flow.

At 220, an accumulated commanded mass flow over the current drive cycle, as given by equation 4, may be determined:

$$E_{cmd} = \Sigma \dot{M}_{cmd} \tag{4}$$

where, $E_{cmd}$ is the accumulated commanded mass flow over the current drive cycle, and $\dot{M}_{cmd}$ is the commanded EGR mass flow.

At 222, a ratio of the accumulated mass flow error to the accumulated commanded mass flow may be estimated as shown in equation 5:

$$E_{ratio1} = \frac{\sum (T_{lo} - \dot{M}_{md})}{\sum \dot{M}_{cmd}} \tag{5}$$

where, $E_{ratio1}$ is the first error ratio of accumulated mass flow to the accumulated commanded mass flow. The first error ratio may be compared to a first threshold, threshold_1. At 224, the routine includes determining if the first error ratio is higher than the first threshold. The first threshold may represent a point in the drive cycle where higher then target emissions levels may result. In other words, if the ratio increases to above the first threshold, during any point in the drive cycle, degradation of the EGR system resulting in undesired emissions may be confirmed.

If it is confirmed that the error ratio is higher than the first threshold, it may be inferred that the EGR system is not degraded and the emissions level may remain within the target range. At 226, the controller may indicate that the EGR system is not degraded and the current EGR valve position may be maintained to deliver the commanded amount of EGR.

However, if it is determined that the error ratio is higher than the first threshold, at 228, degradation of the HP-EGR system may be indicated by setting a diagnostic code (flag). The HP-EGR valve may be closed to suspend EGR flow through the degraded system. In one example, if degradation is detected in the HP-EGR system, the HP-EGR valve may be closed while the opening of the LP-EGR valve may be increased to provide engine dilution via LP-EGR.

If at 212 it is determined that the measured EGR flow rate is not lower than the commanded EGR flow rate, or the accumulated commanded EGR flow rate is lower than the threshold flow rate, at 230, the routine includes determining if the accumulated measured EGR flow rate is higher than the accumulated commanded EGR flow rate.

If it is determined that the measured EGR flow rate is higher than the commanded EGR flow rate, it may be inferred that the actual EGR flow is excessive relative to the commanded EGR flow. The higher than commanded EGR flow may be undesirable since it may result in undesired engine dilution and higher than desired levels of emissions. Therefore, at 234, in order to detect degradation in the EGR system, an EGR diagnostic routine for excessive EGR flow may be carried out. The details of the EGR diagnostic routine for excessive EGR flow is discussed in relation to FIG. 3. If it is determined that the measured EGR flow rate is not higher than the commanded EGR flow rate, it may be inferred that the measured EGR flow rate is substantially equal to the commanded EGR flow rate. At 232, EGR supply may be continued with the EGR valve maintained in the open position without initiation of any diagnostic process.

If at 204 it is determined that EGR is not desired for engine operations, at 236, the routine includes determining if any EGR flow is detected in the HP-EGR passage based on inputs from one or more EGR pressure sensors. If it is determined that EGR flow is detected even when EGR is not commanded, it may be inferred that there may be a leak in the EGR system and at 240, diagnostics for undesired EGR flow may be initiated. The details of the EGR diagnostic routine for undesired EGR flow is discussed in relation to FIG. 4. If any undesired flow is not detected, at 238, the EGR valve may be maintained in the closed position and EGR system diagnostics may not be initiated.

Figure 5:
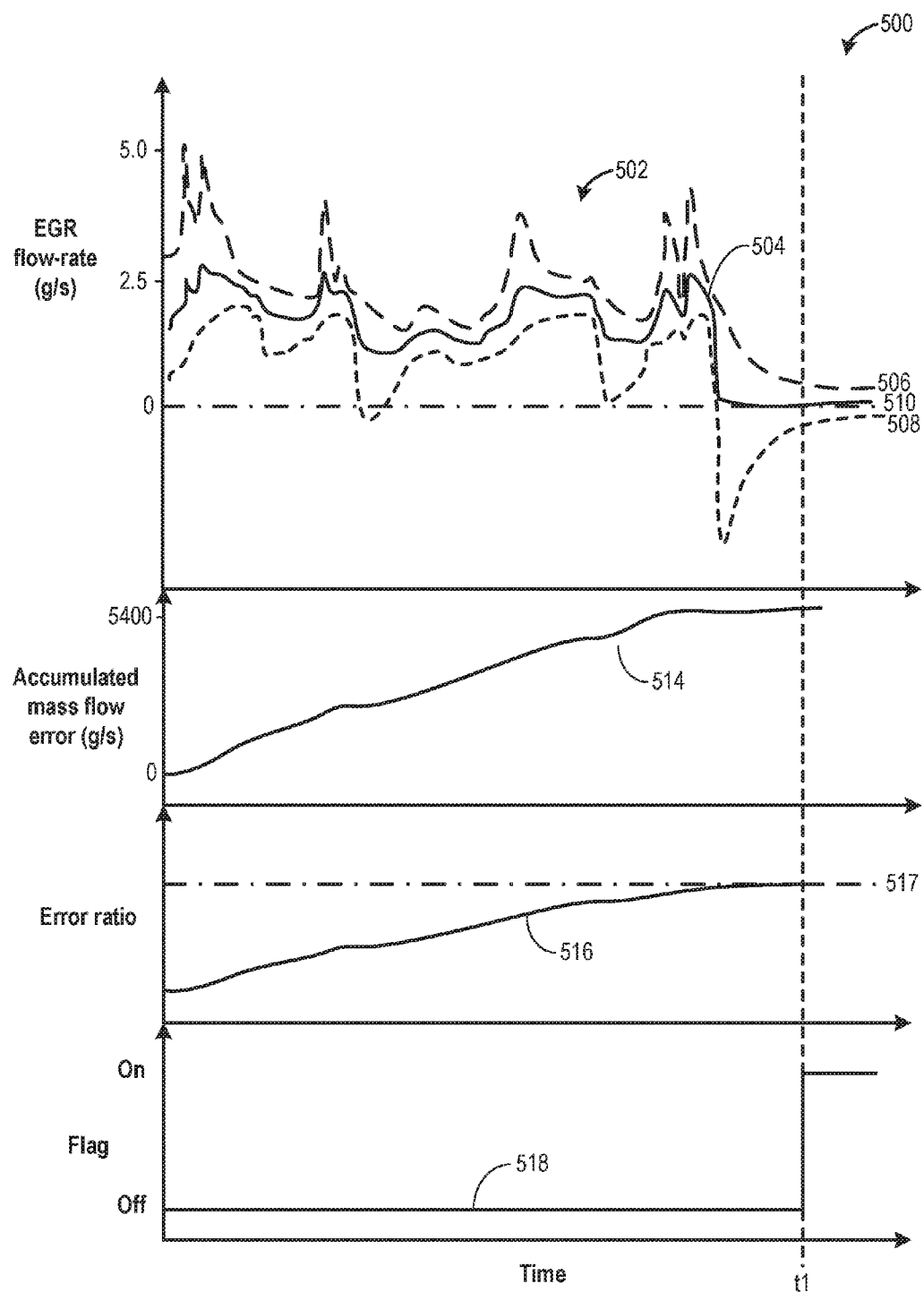
FIG. 5 shows an example diagnostics of the EGR system during insufficient EGR flow.

FIG. 5 shows an example diagnostics routine 500 for a HP-EGR system during insufficient EGR flow. A diagnostics routine, such as the example routine 200 in FIG. 2 may be used to detect degradation of the EGR system causing the measured (actual) EGR flow rate to be lower than the commanded EGR flow rate. The first plot 502 shows variation in EGR flow rate (in g/s) over time. Line 504 shows a commanded EGR flow rate (determined based on engine operating parameters) while line 510 shows measured EGR flow rate (estimated based on inputs from EGR system pressure sensors). In this example, the measured EGR flow rate is substantially zero suggesting insufficient EGR flow relative to the commanded EGR flow.

As discussed in FIG. 2, in order to diagnose the EGR system, a fault tolerance band (dynamic) with an upper and a lower limit may be computed for insufficient EGR flow based on the commanded EGR flow, a fixed error margin, and a multiplier. Line 506 shows the upper limit of the tolerance band and line 508 shows the lower limit of the tolerance band. When the commanded EGR flow is reduced, the lower limit 508 may be further lowered (via a multiplier) to increase the error tolerance such that erroneous detection of EGR system degradation caused due to transport delays is reduced. Similarly, when the commanded EGR flow is increased, the upper limit 506 may be correspondingly increased. The difference between the lower limit 508 of the tolerance band and the measured EGR flow 510 may be computed and accumulated over a test period t1 to determine the accumulated mass flow error. Line 514 shows the change in accumulated mass flow error (g/s) over time. Also, the commanded EGR mass flow may be accumulated over the test period t1 to determine the accumulated commanded EGR mass flow. As such, the test period t1 may be determined by the time taken for the accumulated commanded EGR mass flow to result in a higher than threshold emissions level in an emissions test (such as FTP) cycle. A ratio of the accumulated mass flow error to the accumulated commanded EGR mass flow may be computed to determine an error ratio. Line 516 shows change in the error ratio with time. Dotted line 517 shows a threshold ratio above which the EGR system may be indicated to the degraded. Line 518 shows a flag (diagnostics code) that may be set to indicate EGR system degradation as the error ratio increases to the threshold 517. As seen in this example, the flag may be set at the end of the test period, at time t1, when the error ratio increases to the threshold 517, indicating degradation of the EGR system. In response to the indication of degradation, the HP-EGR valve may be actuated to a closed position and further HP-EGR supply may be discontinued.

Figure 3:
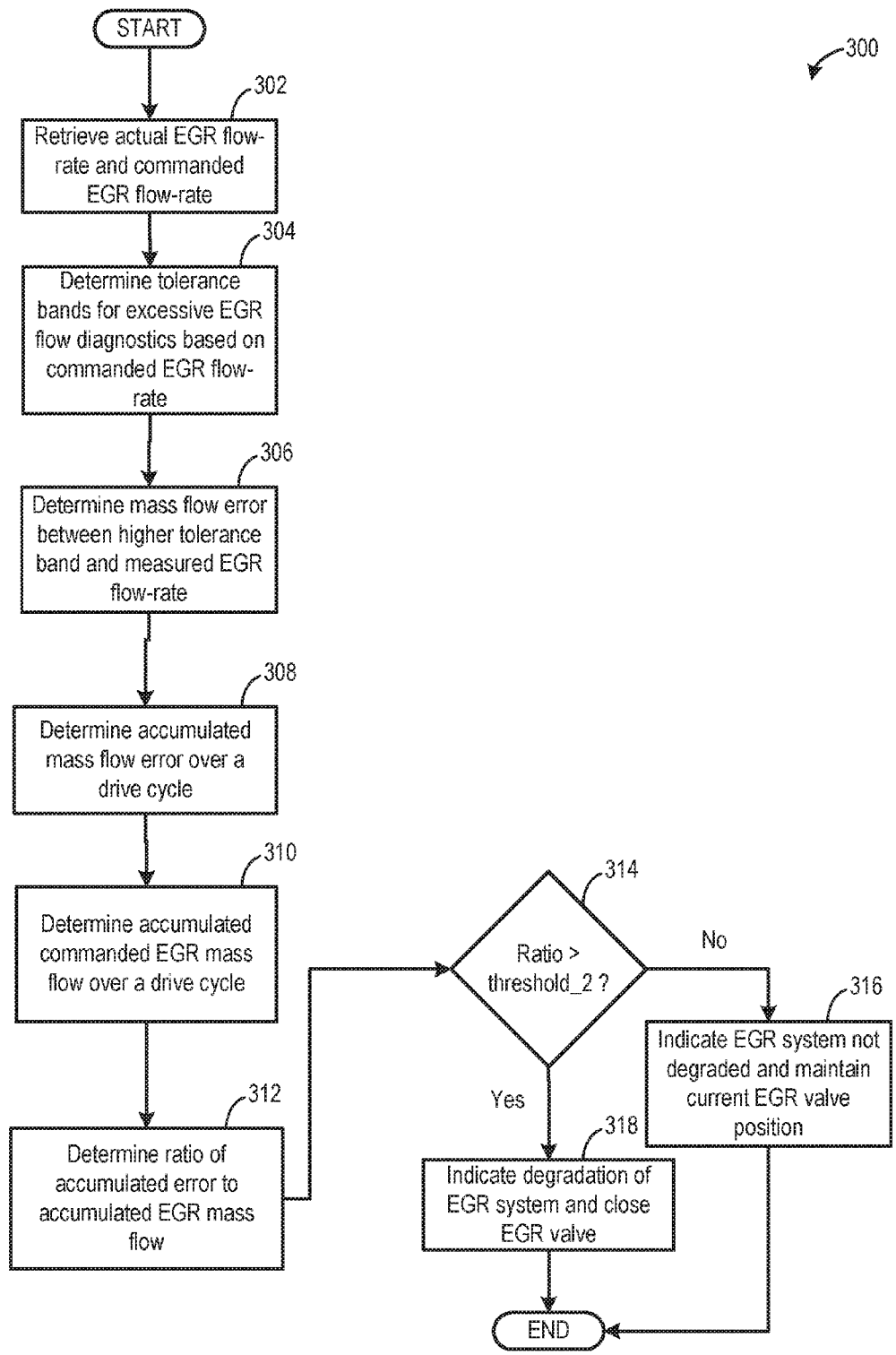
FIG. 3 shows a flow chart illustrating a method that can be implemented for diagnostics of the EGR system during excessive EGR flow.

FIG. 3 illustrates an example method 300 that may be implemented for diagnostics of the EGR system (such as EGR system 140 in FIG. 1) during excessive EGR flow (measured EGR flow rate higher than commanded). The method 300 may be a part of the example method 200 shown in FIG. 2 and may be carried out at step 234 of the method 200.

At 302, the controller may retrieve the actual EGR mass flow rate (flow rate of exhaust flowing through HP-EGR passage) based on inputs from one or more EGR sensors such as EGR delta pressure sensor and EGR pressure sensor coupled to the EGR system. Alternatively, EGR flow rate may be inferred based on inputs from the one or more temperature, pressure, humidity, and air-fuel ratio sensors coupled to the compressor inlet. The controller may determine the amount of EGR commanded based on engine operating conditions such as engine speed, engine load, engine temperature, etc. The controller may determine the HP-EGR flow rate based on a calculation using a look-up table with the input being one or more of engine speed, engine load, engine temperature and the output being the EGR flow rate. Alternatively, the controller may make a logical determination (e.g., regarding the EGR flow rate) based on logic rules that are a function of parameters engine speed, engine load, engine temperature. The controller may then generate a control signal that is sent to the HP-EGR valve.

At 304, a dynamic fault tolerance band with an upper and a lower limit may be determined for excessive EGR flow based on the commanded EGR flow rates. A fixed error margin may be used for determining the upper and lower limits of the tolerance band. The limits of the tolerance bands may be computed based on a measured linear flow distance from an expected (function of commanded) EGR mass flow. An additional multiplier may be used to adjust the tolerance band during change in EGR flow direction such as during increase or decrease in the commanded EGR flowrate based on engine operating conditions. The multiplier provides increased error tolerance in the direction of changing flow while during steady flow a fixed error tolerance may be used. By adjusting the tolerance band during changes in EGR flow direction inaccurate detection of EGR system degradation due to transport delays between commanded and measured EGR flow rate or due to PID controller inaccuracies may be reduced. The upper limit of the tolerance band for excessive EGR flow may be computed based on equation 6 while the lower limit of the tolerance band may be computed based on equation 7 as:

$$T_{lo2} = M\dot{}_{cmd} - S_{err} \quad (6)$$

$$T_{hi2} = M\dot{}_{cmd} + (M\dot{}_{cmd} - M\dot{}_{exp}) * M\dot{}_{mult} - S_{err} \quad (7)$$

where $T_{lo2}$ is the lower limit of the tolerance band, $M\dot{}_{cmd}$ is the commanded EGR mass flow, $S_{err}$ is the fixed error margin, $T_{hi2}$ is the higher limit of the tolerance band, $M\dot{}_{exp}$ is the expected EGR mass flow, and $M\dot{}_{mult}$ is an EGR mass flow multiplier based on commanded EGR flow. The expected EGR mass flow ($M\dot{}_{exp}$) is a filtered version of the commanded EGR mass flow ($M\dot{}_{cmd}$).

At 306, mass flow error between the upper limit of the tolerance band and the measured EGR flow rate may be determined over a drive cycle (test period). At 308, an accumulated mass flow error over the current drive cycle, as given by equation 8, may be determined as:

$$E_{mf2} = \Sigma(M\dot{}_{md} - T_{lo2}) \quad (8)$$

where $E_{mf2}$ is the accumulated mass flow error over the current drive cycle, $T_{lo2}$ is the lower limit of the tolerance band, and $M\dot{}_{md}$ is the measured EGR mass flow.

At 310, an accumulated commanded mass flow over the current drive cycle, as given by equation 4 (as previously introduced in step 220 of method 200), may be determined as:

$$E_{cmd} = \Sigma M\dot{}_{cmd} \quad (4)$$

where, $E_{cmd}$ is the accumulated commanded mass flow over the current drive cycle, and $M\dot{}_{cmd}$ is the commanded EGR mass flow.

At 312, a ratio of the accumulated mass flow error to the accumulated commanded mass flow may be estimated as shown in equation 9 as:

$$E_{ratio2} = \frac{\sum(M\dot{}_{md} - T_{lo2})}{\sum M\dot{}_{cmd}} \quad (9)$$

where, $E_{ratio2}$ is the second error ratio of accumulated mass flow to the accumulated commanded mass flow. The second error ratio may be compared to a second threshold, threshold_2. At 314, the routine includes determining if the second error ratio is higher than the second threshold. The second threshold may represent the point in the drive cycle where higher than desired emissions levels may result. In other words, if the ratio increases to above the second threshold, during any point in the drive cycle, degradation of the EGR system resulting in undesired emissions may be confirmed.

If it is confirmed that the error ratio is higher than the second threshold, it may be inferred that the EGR system is not degraded. At 316, the controller may indicate that the EGR system is not degraded and the current EGR valve position may be maintained to deliver the commanded amount of EGR.

However, if it is determined that the error ratio is higher than the second threshold, at 318, degradation of the HP-EGR may be indicated by setting a diagnostic code (e.g., flag). The HP-EGR valve may be closed to suspend HP-EGR flow through the degraded system.

Figure 7:
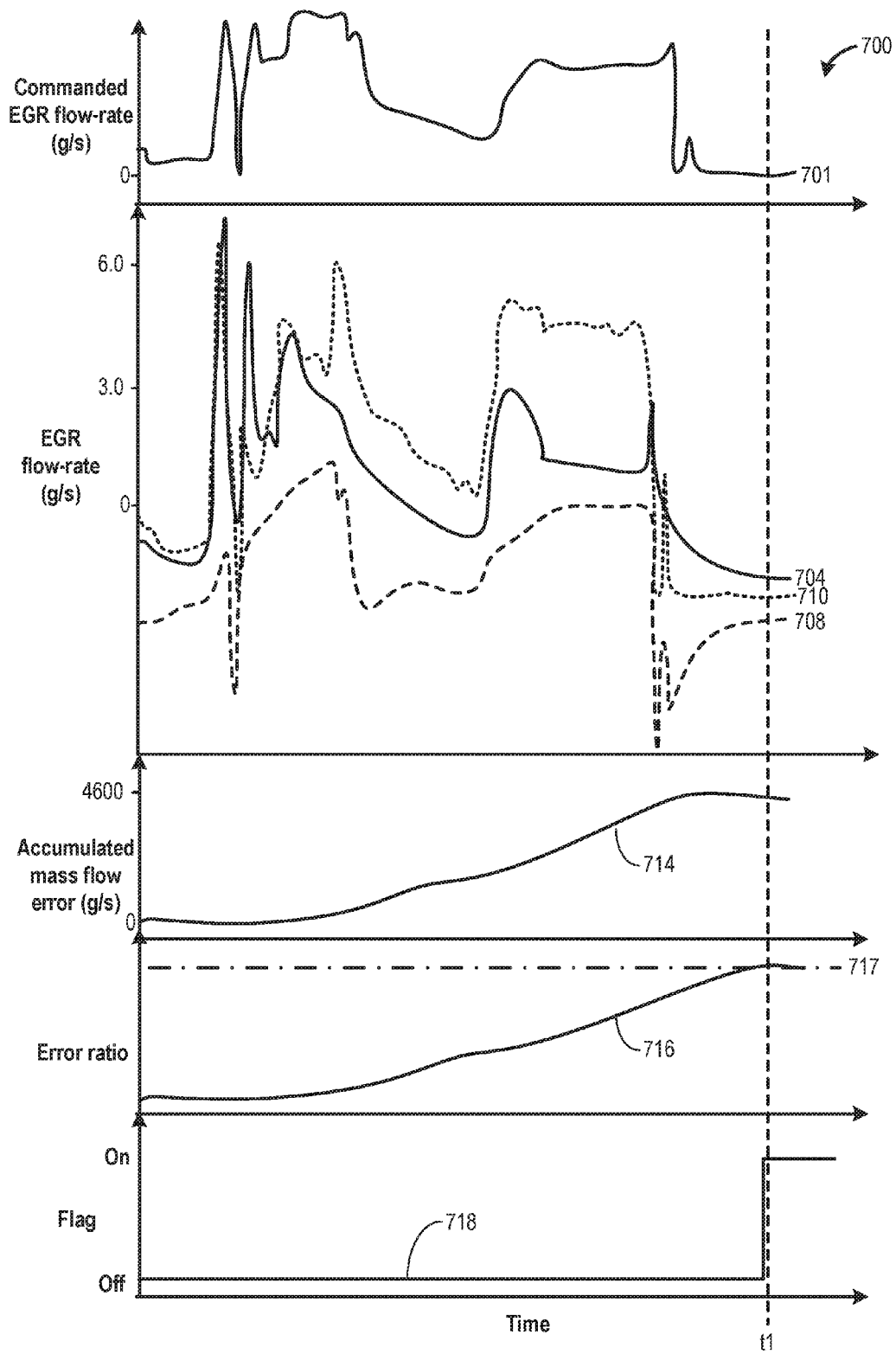
FIG. 7 shows an example diagnostics of the EGR system during excessive EGR flow.

FIG. 7 shows an example diagnostics 700 of an HP-EGR system during excessive EGR flow. A diagnostics routine, such as the example routine 300 of FIG. 3 may be used to detect degradation of the EGR system causing the measured (actual) EGR flow rate to be higher than the commanded EGR flow rate. The first plot, line 701, shows variation in commanded EGR flow rate (in g/s) over time as determined based on engine operating conditions. In the second plot, line 710 shows measured EGR flow rate as estimated based on inputs from EGR system pressure sensors. In this example, the measured EGR flow rate is substantially higher than the commanded EGR flow rate suggesting excessive EGR flow relative to the commanded EGR flow.

As discussed in FIG. 3, in order to diagnose the EGR system, a dynamic fault tolerance band with an upper and a lower limit may be computed for excessive EGR flow based on the commanded EGR flow rates. Line 706 shows the upper limit of the tolerance band and line 708 shows the lower limit of the tolerance band. The difference between the upper limit of the tolerance band 708 and the measured EGR flow 710 may be computed and accumulated over a test period t1 to determine the accumulated mass flow error. Line 714 shows the change in accumulated mass flow error (g/s) over time. Also, the commanded EGR mass flow may be accumulated over the test period t1 to determine the accumulated commanded EGR mass flow. A ratio of the accumulated mass flow error to the accumulated commanded EGR mass flow may be computed to determine an error ratio. Line 716 shows change in the error ratio with time. Dotted line 717 shows a threshold ratio above which the EGR system may be indicated to the degraded. Line 718 shows a flag (diagnostics code) that may be set to indicate EGR system degradation as the error ratio increases to the threshold 717. As seen in this example, the flag may be set at the end of the test period, at time t1, when the error ratio increases to the threshold 717 indicating degradation of the EGR system. In response to the indication of degradation, the EGR valve may be actuated to a closed position and further EGR supply may be discontinued.

Figure 4:
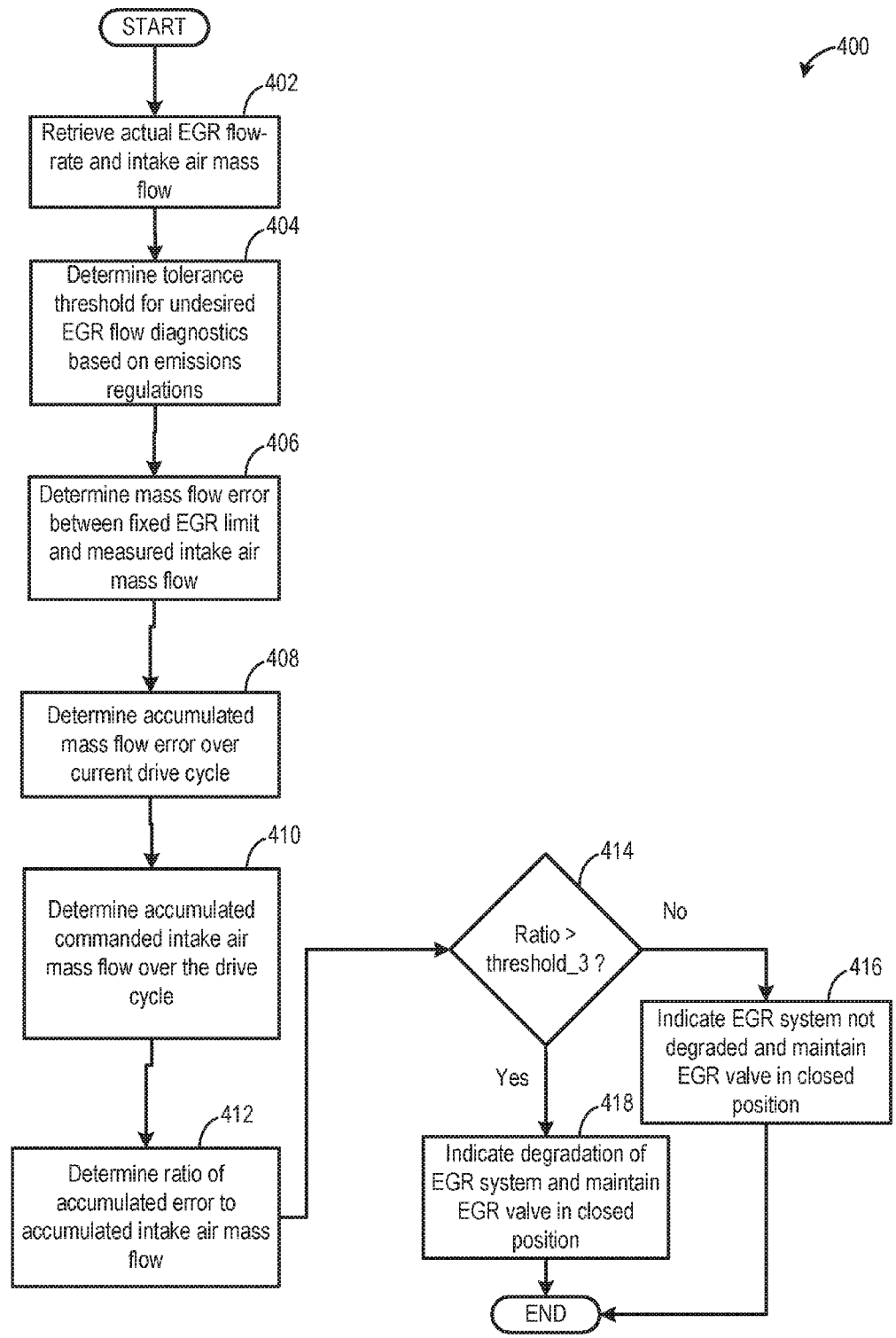
FIG. 4 shows a flow chart illustrating a method that can be implemented for diagnostics of the EGR system during undesired EGR flow.

FIG. 4 illustrates an example method 400 that may be implemented for diagnostics of the HP-EGR system (such as HP-EGR system 144 in FIG. 1) during undesired EGR flow (EGR flow detected when EGR is not commanded). The method 400 may be a part of the example method 200 shown in FIG. 2 and may be carried out at step 240 of method 200.

At 402, the controller may retrieve the actual EGR mass flow rate (flow rate of exhaust flowing through HP-EGR passage) based on inputs from one or more EGR sensors such as an EGR delta pressure sensor and an EGR absolute pressure sensor coupled to the EGR system. Alternatively, EGR flow rate may be inferred by the one or more temperature, pressure, humidity, and air-fuel ratio sensors coupled to the compressor inlet. EGR may flow through the EGR passage even when EGR supply is not commanded due to degradation, such as due to EGR valve leakage or when the EGR valve is stuck in an open position. Also, the controller may determine the intake air mass flow based on inputs from an intake air flow sensor (such as sensor 125 of FIG. 1).

At 404, a fixed EGR limit may be determined for undesired EGR flow based on emissions control regulations. The fixed EGR limit may be a constant value and EGR flow above the fixed EGR limit for a predetermined duration of time may result in undesired levels of emissions. The fixed EGR limit may be distinct from the dynamically adjusted upper and lower EGR limits of the threshold band used for EGR system diagnostics for insufficient and excessive EGR flow. The fixed EGR limit for undesired EGR flow may be computed based on equation 10 as:

$$T_3 = M_{cmd} + S_{err} \quad (10)$$

where, $T_3$ is the fixed EGR limit and $S_{err}$ is the fixed error margin.

At 406, mass flow error between the fixed EGR limit and the measured intake air mass flow may be determined over a drive cycle (test period when no EGR flow is commanded). When EGR flow is not desired, use of the accumulated air flow results in a maximum reference of possible measured EGR mass flow for the error ratio calculation. At 408, an accumulated mass flow error over the current drive cycle, as given by equation 11, may be determined as:

$$E_{mf3} = \Sigma(M_{md} - T_3) \quad (11)$$

where $E_{mf3}$ is the accumulated mass flow error over the current drive cycle, $T_3$ is the fixed EGR limit, and $M_{md}$ is the measured EGR mass flow.

At 410, an intake air mass flow over the current drive cycle, as given by equation 12, may be determined as:

$$E_{af} = \Sigma M_{af} \quad (12)$$

where $E_{af}$ is the accumulated commanded intake air mass flow over the current drive cycle, and $M_{af}$ is the intake air mass flow.

At 412, a ratio of the accumulated mass flow error to the accumulated intake air mass flow may be estimated as shown in equation 13 as:

$$E_{ratio3} = \frac{\sum (M_{md} - T_3)}{\sum M_{af}} \quad (13)$$

where $E_{ratio3}$ is the third error ratio of accumulated mass flow to the accumulated intake air mass flow. The third error ratio may be compared to a third threshold, threshold_3. At 414, the routine includes determining if the third error ratio is higher than the third threshold. The third threshold may represent the point in the drive cycle where higher than desired emissions levels may result due to the undesired EGR flow. In other words, if the ratio increases to above the third threshold, during any point in the drive cycle, degradation of the EGR system (such as EGR valve leak) resulting in undesired emissions may be confirmed.

If it is confirmed that the error ratio is higher than the third threshold, it may be inferred that the HP-EGR system is not degraded and the emissions level may remain within the acceptable limits. At 416, the controller may indicate that the HP-EGR system is not degraded and the current EGR valve position may be maintained in the closed position. However, if it is determined that the error ratio is higher than the third threshold, at 418, degradation of the HP-EGR may be indicated by setting a diagnostic code (e.g., flag). The HP-EGR valve may be maintained in the closed position to suspend further EGR flow through the degraded system.

Figure 6:
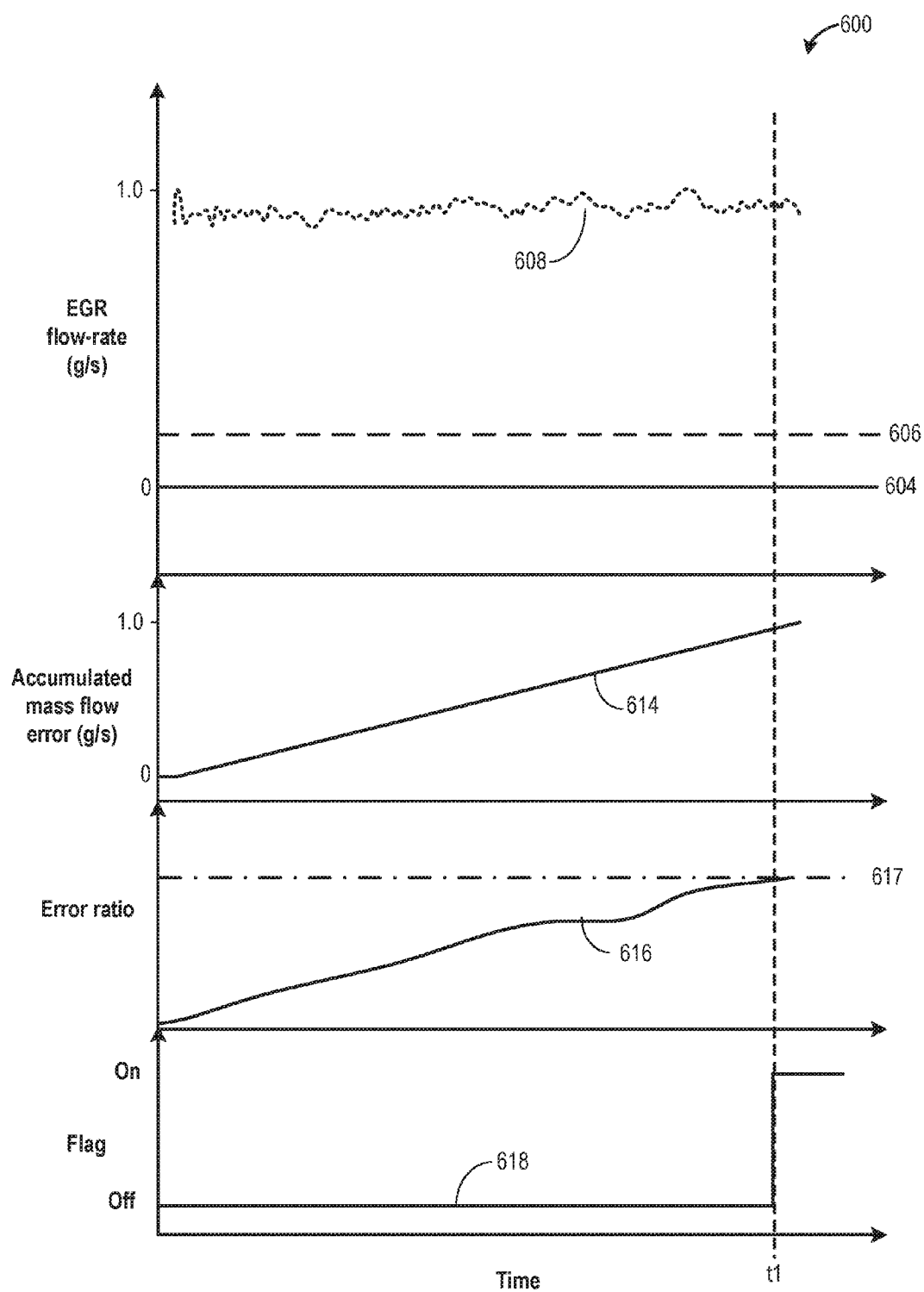
FIG. 6 shows an example diagnostics of the EGR system during undesired EGR flow.

FIG. 6 shows an example diagnostics 600 of a HP-EGR system during undesired EGR flow. A diagnostics routine, such as the example routine 400 in FIG. 4 may be used to detect degradation of the EGR system causing the undesired EGR flow when EGR is not commanded. The first plot, line 604, shows the commanded EGR flow rate (in g/s) over time as determined based on engine operating conditions. In this example, the commanded EGR flow rate is zero as no EGR is desired. Line 608, shows measured EGR flow rate as estimated based on inputs from EGR system pressure sensors. In this example, the measured EGR flow rate is non-zero suggesting undesired EGR flow relative to the commanded HP-EGR flow.

As discussed in FIG. 4, in order to diagnose the EGR system, a fixed EGR limit, line 606, may be computed for undesired EGR flow based on emissions control regulations. The difference between the measured EGR flow 608 and the fixed EGR limit 606 may be computed and accumulated over a test period t1 to determine the accumulated mass flow error. Line 614 shows the change in accumulated mass flow error (g/s) over time. Also, the intake air mass flow may be accumulated over the test period t1 to determine the accumulated intake air mass flow. A ratio of the accumulated mass flow error to the accumulated intake air mass flow may be computed to determine an error ratio. Line 616 shows change in the error ratio with time. Dotted line 617 shows a threshold ratio above which the EGR system may be indicated to be degraded. Line 618 shows a flag (diagnostics code) that may be set to indicate EGR system degradation as the error ratio increases to the threshold 617. As seen in this example, the flag may be set at the end of the test period, at time t1, when the error ratio increases to the threshold 617 indicating degradation (such as a leak in the EGR valve) of the HP-EGR system. In response to the indication of degradation, the HP-EGR valve may be maintained in the closed position to disable future HP-EGR supply.

Figure 8:
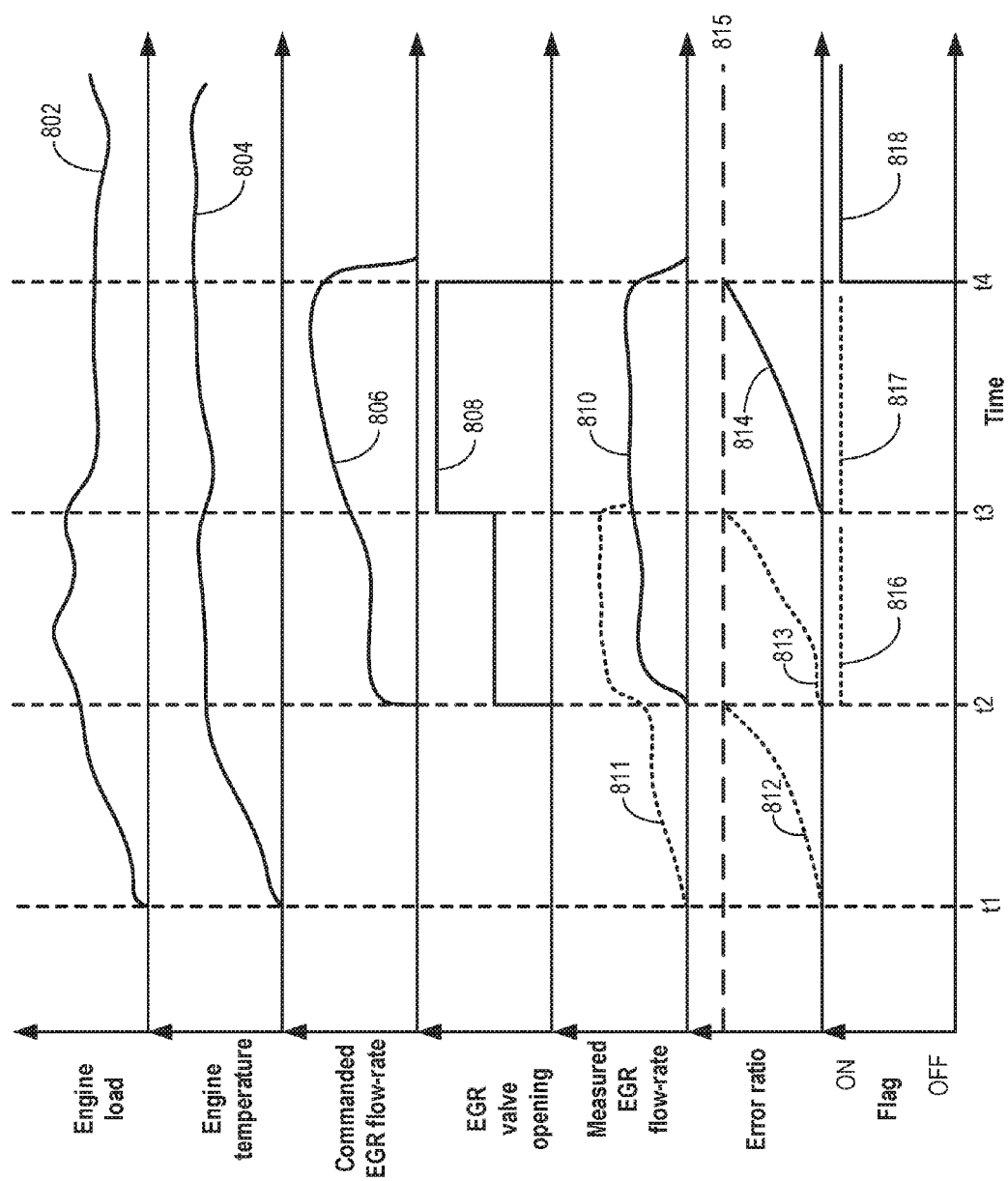
FIG. 8 shows an example detection of EGR system degradation based on EGR system diagnostics.

FIG. 8 shows an example operating sequence 800 illustrating a diagnostic routine of the HP-EGR system of FIG. 1. A similar diagnostic routine may also be carried out for a LP-EGR system. Degradation of the HP-EGR system causing undesired, excessive, or insufficient EGR flow may be indicated following the diagnostic routine. The horizontal (x-axis) denotes time and the vertical markers t1-t4 identify significant times in the operation of the engine exhaust system.

The first plot, line 802, shows variation in engine load over time, as estimated via inputs from a pedal position sensor. The second plot, line 804, shows engine temperature as estimated via inputs from an engine coolant temperature sensor. The third plot, line 806, shows a commanded EGR flow rate as estimated based on engine operating parameters such as engine speed, engine load, and engine temperature. The fourth plot, line 808, shows a position of the HP-EGR valve. The fifth plot, line 810, shows measured EGR flow rate as estimated based on inputs from EGR system pressure sensors. The sixth plot, line 814, shows an error ratio of an accumulated EGR mass flow error and an accumulated commanded EGR mass flow. The accumulated EGR mass flow error includes a difference between a limit of a tolerance band and the measured EGR flow rate accumulated over a time period of the diagnostic test. The accumulated commanded EGR mass flow may also be estimated taking into account EGR mass flow over the time period of the test. Dotted line 815 denotes an error ratio threshold above which the EGR system may be determined to be degraded. The threshold 815 may be based on a measured exhaust emissions level including one of an exhaust NOx level and an exhaust particulate matter level. As such, the threshold may be different for EGR diagnostics when the measured EGR flow is lower than the commanded EGR flow, when the measured EGR flow is higher than the commanded EGR flow, or when the measured EGR flow is higher than the commanded no EGR flow. The seventh plot, line 818, shows a position of a flag indicating degradation of the EGR system.

Prior to time t1, the engine is shut down and the vehicle is not propelled using engine torque. At time t1, in response to an operator torque demand, the engine starts from rest after a period of inactivity. Based on engine operating conditions including engine load, engine speed, and engine temperature, the controller may determine that EGR is not desired for engine operations between time t1 and t2. Therefore, between time t1 and t2, the EGR valve is maintained in the closed position to disable EGR flow. As seen in this example, there is no undesired EGR flow between t1 and t2, therefore EGR system diagnostics is not carried out and the flag is not set.

However, if there was a degradation in the EGR system (such as a leak in the EGR valve), as shown by dotted line 811, undesired EGR flow may occur. If undesired EGR flow was detected, a diagnostic routine may be initiated. Therein, in response to a measured non-zero EGR flow, EGR degradation may be indicated based on the error ratio (dotted line 812) of accumulated difference between the measured non-zero EGR flow and a fixed EGR limit to accumulated intake air flow being higher than the threshold 815. The accumulated difference and the accumulated intake air flow may be estimated between time t1 and t2. If the error ratio (line 812) reaches the threshold 815 at time t2, degradation of the EGR system causing undesired EGR flow may be indicated and consequently, as shown by dotted line 816, the flag (diagnostic code set) may be set at time t2. In response to the indication of degradation of the EGR system causing undesired EGR flow, the EGR valve may be maintained in the closed position disabling future EGR flow.

At time t2, in response to increase in engine temperature, EGR is required for engine operations. The commanded amount of EGR is determined by the controller based on engine operating parameters such as engine temperature, engine load, and engine speed. The opening of the EGR valve is adjusted to admit a commanded amount of EGR to the intake manifold. Between time t2 and t3, the measured (actual) amount of EGR delivered is substantially equal to the commanded amount of EGR. Therefore, EGR diagnostics is not carried out between time t2 and t3 and the flag may be maintained in the off position.

However, if excessive EGR flow is detected such as when the measured EGR flow is substantially higher than the commanded EGR flow (as shown by dotted line 811), a diagnostic routine may be initiated to indicate degradation in the EGR system causing the excessive EGR flow. When the measured EGR flow is higher than the commanded EGR flow, an error ratio (as shown by dotted line 813) of accumulated difference between the measured EGR flow and an upper EGR limit of a tolerance band to accumulated commanded EGR flow may be estimated. The ratio may then be compared to the threshold 815, and in response to the ratio being higher than the threshold 815, at time t3, EGR system degradation may be indicated. In response to the indication of degradation of the EGR system causing excessive EGR flow, the flag may be set at time t3 and the EGR valve may be actuated to a closed position disabling future EGR flow.

At time t3, in response to a decrease in engine load, there is an increase in the amount of EGR commanded for engine operations. The opening of the EGR valve is increased to supply the increased EGR amount. However, between time t3 and t4, it is observed that there is no substantial increase in EGR flow (relative to EGR flow between t2 and t3) even when the opening of the EGR valve is increased. Therefore, in response to the insufficient EGR flow, a diagnostic routine is initiated at time t3. When the measured EGR flow is lower than the commanded EGR flow, an error ratio 814 of accumulated difference between the measured EGR flow and a lower EGR limit of the tolerance band to accumulated commanded EGR flow is estimated. The ratio is then compared to the threshold 815, and in response to the ratio being higher than the threshold 815, at time t4, EGR system degradation is indicated. In response to the indication of EGR system degradation causing insufficient EGR flow, at time t4, the flag is set. Also, in response to detection of degradation of the EGR system, at time t4, the EGR valve is actuated to a closed position to suspend exhaust flow through the degraded EGR system. After time t4, the flag continues to be set and EGR remains disabled.

An example engine method comprises: as commanded EGR flow changes, dynamically adjusting upper and lower EGR limits based on the commanded EGR flow, indicating EGR system degradation based on a ratio of accumulated difference between a measured EGR flow and one of the upper and lower EGR limits to accumulated commanded EGR flow relative to a threshold, the threshold based on exhaust NOx levels, and adjusting EGR flow based on the indication of degradation. In any preceding example, additionally or optionally, the dynamically adjusting includes selecting each of the upper and lower EGR limit as a function of the commanded EGR flow, a fixed error margin, and a multiplier, the multiplier determined as a function of the commanded EGR flow. In any or all of the preceding examples, additionally or optionally, the threshold includes a first threshold when the measured EGR flow is higher than the commanded EGR flow and a second, different threshold when the measured EGR flow is lower than the commanded EGR flow. In any or all of the preceding examples, additionally or optionally, indicating based on the ratio includes, when the measured EGR flow is higher than the commanded EGR flow, indicating based on the ratio of accumulated difference between the measured EGR flow and the upper EGR limit to accumulated commanded EGR flow. In any or all of the preceding examples, additionally or optionally, the indicating based on the ratio further includes, when the measured EGR flow is lower than the commanded EGR flow, indicating based on the ratio of accumulated difference between the measured EGR flow and the lower EGR limit to accumulated commanded EGR flow. In any or all of the preceding examples, the indicating additionally or optionally includes, when the measured EGR flow is higher than the commanded EGR flow, comparing the ratio to the first threshold, and in response to the ratio being higher than the first threshold, indicating EGR system degradation. In any or all of the preceding examples, additionally or optionally, the indicating further includes, when the measured EGR flow is lower than the commanded EGR flow, comparing the ratio to the second threshold, and in response to the ratio being higher than the second threshold, indicating EGR system degradation. In any or all of the preceding examples, additionally or optionally, adjusting EGR flow includes actuating an EGR valve to a closed position to suspend EGR flow. Any or all of the preceding examples further comprises, additionally or optionally, when the commanded EGR flow includes no EGR flow, in response to a measured non-zero EGR flow, indicating EGR degradation based on an error ratio of accumulated difference between the measured non-zero EGR flow and a fixed EGR limit to accumulated intake air flow being higher than a third threshold, and responsive to the indication of degradation, suspending EGR flow, wherein the third threshold is based on exhaust NOx levels, the fixed EGR limit distinct from the dynamically adjusted upper and lower ER limits. In any or all of the preceding examples, additionally or optionally, the engine is coupled in a vehicle, and wherein the accumulated difference between the measured EGR flow and one of the upper and lower EGR limits, the accumulated difference between the measured non-zero EGR flow and the EGR limit, and the accumulated intake air flow are accumulated over a duration or distance of vehicle travel, and wherein the EGR flow includes a high pressure EGR flow from upstream of an exhaust turbine to downstream of an intake compressor.

Another example method for an engine comprises: when measured EGR flow is higher than commanded EGR flow, indicating EGR system degradation based on a first accumulated difference between the measured EGR flow and an upper limit accumulated over a duration, when measured EGR flow is lower than commanded EGR flow, indicating EGR system degradation based on a second accumulated difference between the measured EGR flow and a lower limit accumulated over the duration, each of the upper limit and the lower limit dynamically adjusted based on the commanded EGR flow. Any preceding example further comprises, additionally or optionally, responsive to the indicating, closing an EGR valve to discontinue EGR flow. In any or all of the preceding examples, additionally or optionally, the indicating includes, estimating a first ratio of the first accumulated difference to an accumulated commanded EGR mass flow over the duration, and indicating EGR system degradation in response to the first ratio being higher than a first threshold. In any or all of the preceding examples, additionally or optionally, the indicating further includes, estimating a second ratio of the second accumulated difference to the accumulated commanded EGR mass flow accumulated over the duration, and indicating EGR system degradation in response to the second ratio being higher than a second threshold, different from the first threshold. In any or all of the preceding examples, additionally or optionally, the indicating further includes, when commanded EGR flow includes no EGR flow, and measured EGR flow is higher than the commanded no EGR flow, estimating a third accumulated difference between the measured EGR flow and an error limit over the duration, estimating a third ratio of the third accumulated difference to accumulated commanded intake air mass flow accumulated over the duration, and indicating EGR system degradation in response to the third ratio being higher than a third threshold, different from each of the first and second threshold. In any or all of the preceding examples, additionally or optionally, each of the first threshold, the second threshold, and the third threshold are based on a measured exhaust emissions component level including one of an exhaust NOx level and an exhaust particulate matter level. In any or all of the preceding examples, additionally or optionally, the upper limit and the lower limit are continually varied as a function of the commanded EGR flow, and wherein the error limit is a fixed error limit.

In yet another example, a vehicle engine system comprises: an intake manifold and an exhaust manifold, a turbocharger comprising an exhaust turbine and an intake compressor, a low-pressure exhaust gas recirculation (LP-EGR) system comprising a first EGR passage with a first EGR valve for recirculating exhaust from downstream of the turbine in the exhaust manifold to upstream of the compressor in the intake manifold, a high-pressure exhaust gas recirculation (HP-EGR) system comprising a second EGR passage with a second EGR valve for recirculating exhaust from the upstream of the turbine in the exhaust manifold to downstream of the compressor in the intake manifold, a temperature sensor, an absolute pressure sensor, and a differential pressure sensor coupled to each of the LP-EGR and the HP-EGR system, and a controller with computer readable instructions stored on non-transitory memory for: in response to measured EGR flow via the HP-EGR system being higher or lower than a commanded EGR flow, accumulating a difference between the measured EGR flow and one of an upper limit and a lower limit over a duration of vehicle travel, the upper and lower limit dynamically adjusted as a function of the commanded EGR flow, accumulating the commanded EGR flow over the duration, in response to a ratio of the accumulated difference to the accumulated commanded EGR flow being higher than the threshold, indicating degradation of the HP-EGR system, and in response to the indicating, actuating the second EGR valve to a closed position while increasing an opening of the first EGR valve. In any or all of the preceding examples, additionally or optionally, the accumulated difference includes an accumulated difference between the measured EGR flow and the upper limit when the EGR flow is higher than the commanded flow, and an accumulated difference between the measured EGR flow and the lower limit when the EGR flow is lower than the commanded flow, and wherein the threshold is based on an exhaust emissions level. In any or all of the preceding examples, additionally or optionally, the measured EGR flow is based on input from the absolute pressure sensor and the differential pressure sensor, and wherein the commanded EGR flow is based on engine temperature as estimated via an engine coolant temperature sensor, engine load as estimated via a pedal position sensor, and engine speed as estimated via a crankshaft acceleration sensor.

In this way, by adjusting the threshold for detection of EGR system degradation based on EGR flow conditions, unintended emissions due to degradation of the EGR system may be reduced. By estimating undesired EGR flow when no EGR flow is requested, degradations such as leaks in the EGR system may be detected. The technical effect of dynamically computing the tolerance band for EGR mass flow error including increasing the tolerance limit in the direction of change in EGR flow, erroneous indications of EGR system degradation due to transport delays between delivered and commanded EGR flow rates may be reduced. By differentiating between undesired, excessive, and insufficient EGR flow issues, suitable measures may be undertaken to mitigate the specific cause of degradation. Overall, by enabling diagnostics of the EGR system to be carried out reliably and accurately, the fuel economy and emissions benefits of the system may be extended over a wider range of engine operating conditions.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating an engine comprising:
as commanded EGR flow changes,
dynamically adjusting upper and lower EGR limits based on the commanded EGR flow; indicating EGR system degradation based on a ratio of accumulated difference between a measured EGR flow and one of the upper and lower EGR limits to accumulated commanded EGR flow relative to a threshold, the threshold based on exhaust NOx levels; and
adjusting EGR flow based on the indication of degradation.

2. The method of claim 1, wherein the dynamically adjusting includes selecting each of the upper and lower EGR limit as a function of the commanded EGR flow, a fixed error margin, and a multiplier, the multiplier determined as a function of the commanded EGR flow.

3. The method of claim 1, wherein the threshold includes a first threshold when the measured EGR flow is higher than the commanded EGR flow and a second, different threshold when the measured EGR flow is lower than the commanded EGR flow.

4. The method of claim 3, wherein indicating based on the ratio includes, when the measured EGR flow is higher than the commanded EGR flow, indicating based on the ratio of accumulated difference between the measured EGR flow and the upper EGR limit to accumulated commanded EGR flow.

5. The method of claim 4, wherein the indicating based on the ratio further includes, when the measured EGR flow is lower than the commanded EGR flow, indicating based on the ratio of accumulated difference between the measured EGR flow and the lower EGR limit to accumulated commanded EGR flow.

6. The method of claim 4, wherein the indicating includes, when the measured EGR flow is higher than the commanded EGR flow, comparing the ratio to the first threshold, and in response to the ratio being higher than the first threshold, indicating EGR system degradation.

7. The method of claim 6, wherein the indicating further includes, when the measured EGR flow is lower than the commanded EGR flow, comparing the ratio to the second threshold, and in response to the ratio being higher than the second threshold, indicating EGR system degradation.

8. The method of claim 1, wherein adjusting EGR flow includes actuating an EGR valve to a closed position to suspend EGR flow.

9. The method of claim 1, further comprising, when the commanded EGR flow includes no EGR flow, in response to a measured non-zero EGR flow, indicating EGR degradation based on an error ratio of accumulated difference between the measured non-zero EGR flow and a fixed EGR limit to accumulated intake air flow being higher than a third threshold, and responsive to the indication of degradation, suspending EGR flow, wherein the third threshold is based on exhaust NOx levels, the fixed EGR limit distinct from the dynamically adjusted upper and lower ER limits.

10. The method of claim 9, wherein the engine is coupled in a vehicle, and wherein the accumulated difference between the measured EGR flow and one of the upper and lower EGR limits, the accumulated difference between the measured non-zero EGR flow and the EGR limit, and the accumulated intake air flow are accumulated over a duration or distance of vehicle travel, and wherein the EGR flow includes a high pressure EGR flow from upstream of an exhaust turbine to downstream of an intake compressor.

11. A method for operating an engine, comprising:
when measured EGR flow is higher than commanded EGR flow,
indicating EGR system degradation based on a first accumulated difference between the measured EGR flow and an upper limit accumulated over a duration;
when measured EGR flow is lower than commanded EGR flow,
indicating EGR system degradation based on a second accumulated difference between the measured EGR flow and a lower limit accumulated over the duration, each of the upper limit and the lower limit dynamically adjusted based on the commanded EGR flow.

12. The method of claim 11, further comprising, responsive to the indicating, closing an EGR valve to discontinue EGR flow.

13. The method of claim 11, wherein the indicating includes, estimating a first ratio of the first accumulated difference to an accumulated commanded EGR mass flow over the duration, and indicating EGR system degradation in response to the first ratio being higher than a first threshold.

14. The method of claim 13, wherein the indicating further includes, estimating a second ratio of the second accumulated difference to the accumulated commanded EGR mass flow accumulated over the duration, and indicating EGR system degradation in response to the second ratio being higher than a second threshold, different from the first threshold.

15. The method of claim 13, wherein the indicating further includes, when commanded EGR flow includes no EGR flow, and measured EGR flow is higher than the commanded no EGR flow, estimating a third accumulated difference between the measured EGR flow and an error limit over the duration, estimating a third ratio of the third accumulated difference to accumulated commanded intake air mass flow accumulated over the duration, and indicating EGR system degradation in response to the third ratio being higher than a third threshold, different from each of the first and second threshold.

16. The method of claim 15, wherein each of the first threshold, the second threshold, and the third threshold are based on a measured exhaust emissions component level including one of an exhaust NOx level and an exhaust particulate matter level, the first threshold higher than the second threshold and the third threshold higher than the second threshold.

17. The method of claim 15, wherein the upper limit and the lower limit are continually varied as a function of the commanded EGR flow, and wherein the error limit is a fixed error limit.

18. A vehicle engine system comprising:
an intake manifold and an exhaust manifold;
a turbocharger comprising an exhaust turbine and an intake compressor;
a low-pressure exhaust gas recirculation (LP-EGR) system comprising a first EGR passage with a first EGR valve for recirculating exhaust from downstream of the turbine in the exhaust manifold to upstream of the compressor in the intake manifold;
a high-pressure exhaust gas recirculation (HP-EGR) system comprising a second EGR passage with a second EGR valve for recirculating exhaust from the upstream of the turbine in the exhaust manifold to downstream of the compressor in the intake manifold;
a temperature sensor, an absolute pressure sensor, and a differential pressure sensor coupled to each of the LP-EGR and the HP-EGR system; and
a controller with computer readable instructions stored on non-transitory memory for:
in response to measured EGR flow via the HP-EGR system being higher or lower than a commanded EGR flow,
accumulating a difference between the measured EGR flow and one of an upper limit and a lower limit over a duration of vehicle travel, the upper and lower limit dynamically adjusted as a function of the commanded EGR flow;
accumulating the commanded EGR flow over the duration;
in response to a ratio of the accumulated difference to the accumulated commanded EGR flow being higher than the threshold, indicating degradation of the HP-EGR system; and
in response to the indicating, actuating the second EGR valve to a closed position while increasing an opening of the first EGR valve.

19. The system of claim 18, wherein the accumulated difference includes an accumulated difference between the measured EGR flow and the upper limit when the EGR flow is higher than the commanded flow, and an accumulated difference between the measured EGR flow and the lower limit when the EGR flow is lower than the commanded flow, and wherein the threshold is based on an exhaust emissions level.

20. The system of claim 18, wherein the measured EGR flow is based on input from the absolute pressure sensor and the differential pressure sensor, and wherein the commanded EGR flow is based on engine temperature as estimated via an engine coolant temperature sensor, engine load as estimated via a pedal position sensor, and engine speed as estimated via a crankshaft acceleration sensor.

* * * * *